United States Patent [19]

Prince

[11] Patent Number: 4,590,705
[45] Date of Patent: May 27, 1986

[54] LANDSCAPING DEVICE

[76] Inventor: Daniel O. Prince, P.O. Box 3149, Dallas, Tex. 75221

[21] Appl. No.: 547,565

[22] Filed: Nov. 1, 1983

[51] Int. Cl.⁴ .............................................. A01G 13/02
[52] U.S. Cl. ...................................................... 47/25
[58] Field of Search ......................... 47/23, 25, 32, 33; 52/102, 101, 153, 165; 210/163–166; 404/2, 4; 256/1, 32

[56] References Cited

U.S. PATENT DOCUMENTS 3,571,972  4/1971  Carter ...................................... 47/25

FOREIGN PATENT DOCUMENTS 2856473  7/1980  Fed. Rep. of Germany ...... 210/164
3243181  5/1984  Fed. Rep. of Germany .......... 47/25
376167  1/1907  France ..................................... 47/25

*Primary Examiner*—Robert A. Hafer
*Assistant Examiner*—Danton D. DeMille
*Attorney, Agent, or Firm*—Berman, Aisenberg & Platt

[57] ABSTRACT

A landscaping device comprises a plurality of segments which may be interconnected to surround a plant or other vertical object. Each segment is made of a plurality of radially extending walls which are spaced to provide a plurality of reservoirs. The reservoirs are triangular-shaped to direct water toward the root system of the plant. The bottom surfaces of the reservoirs are permeable so that water which fills the reservoir through rain or run-off will seep slowly into the ground surrounding the plant. The apparatus has a substantially flat top so that a lawn mower or other implement may easily drive over it to facilitate trimming the vegetation surrounding the element.

4 Claims, 4 Drawing Figures

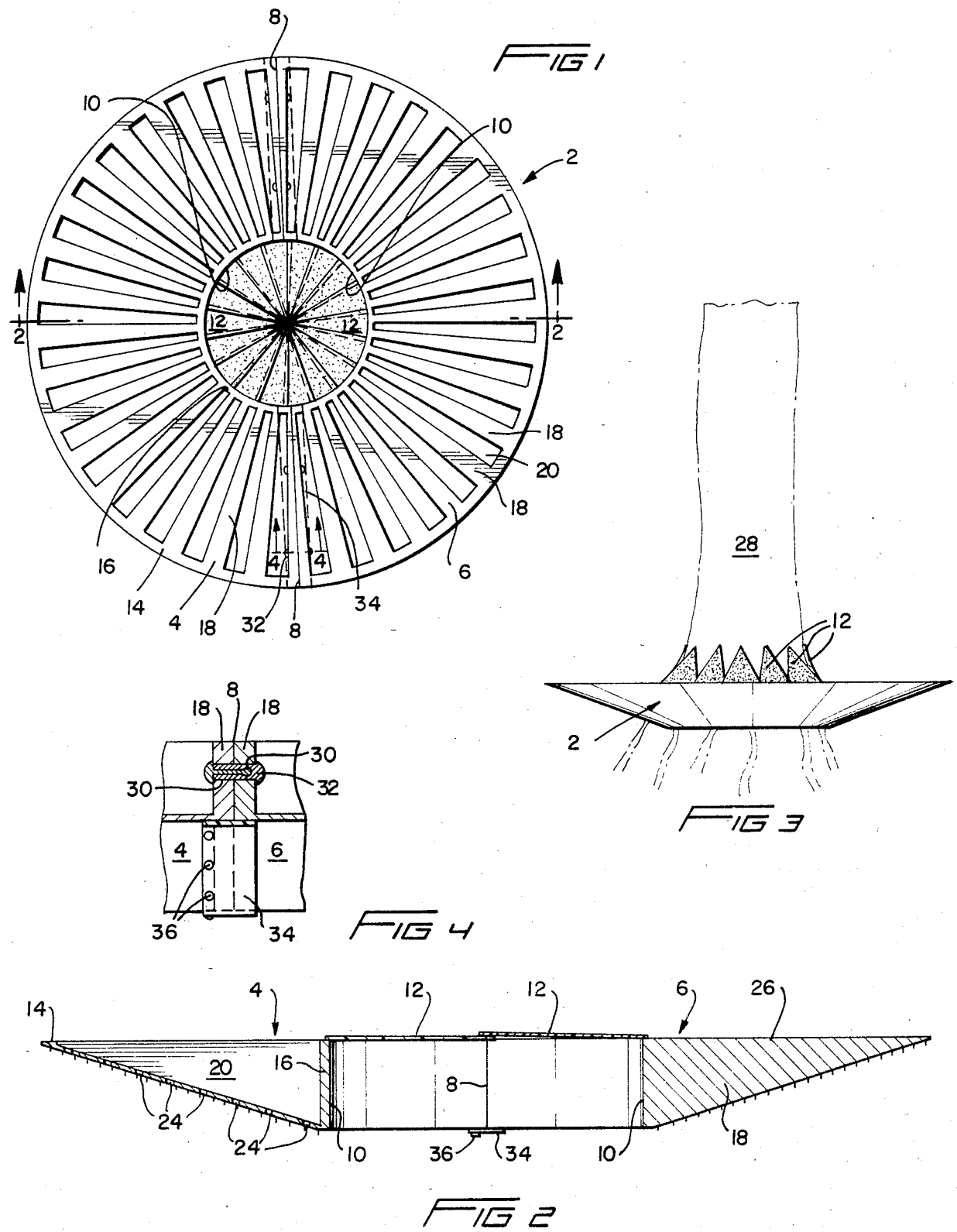

LANDSCAPING DEVICE

FIELD OF THE INVENTION

This invention relates to the art of articles which are used in landscaping to surround a vertical object; particularly, the art of edging devices which surround plants.

BACKGROUND ART

A common problem in landscaping is the growth of grass and weeds surrounding the base of a plant or other vertical object. This grass is difficult to mow with a standard lawn mower and must be trimmed by hand. Trimming by hand or by lawn mower does substantial damage to the plant since it is virtually impossible to prevent bumping the plant with the mower.

A common method for preventing the growth of unwanted weeds and grass around the base of a plant is to apply mulch of some sort around the base of the plant. This mulch may be shredded bark, grass clipping, peat moss, etc.

Mulching suffers from the disadvantage that it must be continually replaced, and this requires a substantial amount of maintenance. Furthermore, it is common for the mulch to be moved by wind or rain, or by an animal, thus allowing grass or weeds to grow.

It is also known to place elements made of synthetic material around the base of a plant. U.S. Pat. No. 4,268,992 (Scharf, Jr.) shows a tree protector having two semicircular portions which fit together to surround a plant. This disk includes a spike for allowing water to seep into the ground.

U.S. Pat. No. 3,727,347 (Barns) shows a disk of artificial grass which is secured to the ground by a large staple. This article does not provide effective means for preventing the growth of weeds or grass and also allowing water to seep into the ground surrounding the plant. U.S. Pat. Nos. 3,571,972 and 3,704,004 (Carter, Jr.) show disks which surround plants wherein a central portion of the disk has triangular elements which extend along the trunk of the disk.

Neither of the Carter patents shows an effective means for providing a surface for receiving the wheel of a lawn mower and for allowing water to seep into the ground surrounding the plant.

SUMMARY OF THE INVENTION

The invention is a landscaping device which comprises a plurality of segments which may be interconnected to surround the base of a plant, or other vertical object. Each segment is made of a synthetic material and is triangular in radial cross section. This triangular shape provides a flat top which will be level with the surface of the ground when installed, and a sloping bottom surface. The segments comprise a plurality of triangular walls which are spaced to provide a plurality of triangular chambers. The chambers receive water from rain directly and by run-off from the adjacent ground. The bottom of the disk is water permeable so that water which fills the reservoirs is allowed to seep into the ground.

The invention preferably comprises two semi-circular segments which are attached to each other along exposed diametrical edges. Each segment has a semi-circular cut-out so that when the segments are secured together, a circular aperture is provided for receiving the trunk of a plant or other vertical object. The aperture has a plurality of triangular flaps for engaging the vertical object, and the flaps are flexible so that the object may grow and thus increase in diameter without the necessity of replacing the landscaping device.

It is an object of this invention to provide a landscaping article for surrounding the base of a plant or other vertical object.

It is a further object of this invention to provide a landscaping article comprising a plurality of segments which may be interconnected to form a disk-like element for preventing the growth of plants around the base of a selected plant.

It is a still further object of the invention to provide a landscaping article wherein a plurality of triangular shaped chambers receive water and allow the water to seep into the roots surrounding a plant.

BRIEF DESCRIPTION OF THE DRAWINGS

FIG. 1 is a plan view of the invention.

FIG. 2 is a cross section taken along line 2—2 of FIG. 1.

FIG. 3 is a side view of the invention showing its installation around the base of a tree.

FIG. 4 is a cross section taken along line 4—4 of FIG. 1.

DETAILED DESCRIPTION OF THE INVENTION

The landscaping device 2 shown in FIG. 1 is a circular, disk-like element. It should be understood that while it is shown as being circular, it is not necessary to adhere to the strictly circular shape. The device shown in FIG. 1 comprises a first segment 4 and a second segment 6. The segments are shown connected along a seam 8 which is the intersection of a diametrical edge of each segment 4 and 6. These segments are secured together by a plurality of rivets 32 which will be described below with respect to FIG. 4.

Each of these segments has a cut-out to form a semi-circular edge 10 so that when the segments are interconnected, a generally circular aperture will result. Connected to the semi-circular edge 10 is a plurality of triangular flaps 12. Bases of the triangles are connected to the semi-circular edge so that the plurality of flaps overlap to close the aperture formed by the edges 10. Since the tips of the flaps are free, a plant, or other vertical object, may extend through the aperture and the space between the object and the edge 10 will always be covered. This is highly advantageous since the circular edge 10 may be made large enough to permit substantial growth in a plant without the necessity of replacing the entire landscaping device 2 as the diameter of the trunk of the plant increases.

Each segment 4 and 6 includes an inner band 16. A plurality of walls 18 extend in a generally radial direction outwardly from band 16. These walls are triangular in radial cross section and are tapered in thickness to be slightly trapezoidal in plan view. A bottom 22 is located between walls 18 and has an upper edge 14. Between adjacent walls 18 is a chamber or reservoir 20. This chamber is formed by an inner band 16, adjacent walls 18, and upper edge 14.

Referring now to FIG. 2, each segment 4 and 6 is shown in cross section. Each segment has a bottom 22 which connects the walls 18 and forms a bottom of the chamber 20. The bottom 22 has a plurality of apertures 24 so that when a chamber 20 becomes filled with water as a result of rain or run-off, the water will be retained in the chamber and allowed to slowly seep into the ground surrounding the plant. This chamber provides a significant amount of storage capacity because of its triangular shape and also causes the water to be directed inwardly toward the roots of the plant.

The top portions 26 of the walls 18 are substantially flat and coplanar. This provides a flat upper surface for the landscaping device 2 which results in several significant advantages. First, the disk is attractive since it lies generally at the same level as the surrounding ground. Secondly, it provides a surface which is easily contacted by a lawn mover, or other machine so that trimming the grass surrounding the plant is greatly facilitated.

FIG. 3 shows the device 2 installed around a tree 28. It will be seen how the flaps 12 engage the trunk of the tree and yet still overlap so that there is no open space between the inner edge 10 and the trunk of the tree. Thus, weeds and grass do not grow in the area covered by the inventive landscaping device.

The manner in which the segments are connected is shown in FIG. 4. Each segment is provided with walls 18 on its exposed diametrical edge so that walls from two segments may be brought into contact, as shown in FIG. 4, to form the seam 8. These walls have a plurality of holes 30 which will be in alignment when the two segments are properly engaged. A connector, such as a plastic rivet 32, is then inserted through the holes 30 to secure the segments together. In order to ensure that no grass or weeds grow through the seam 8, a sealing element 34 is attached to one of the segments and extends outwardly from one segment to engage the other segment and to traverse the seam 8. In FIG. 4, sealing means 34 is shown attached to segment 4 by a plurality of screws 36.

It will thus be seen that an extremely efficient landscaping device has been shown and described. This element may be made of any suitable material, but it is preferably made of a synthetic plastic material. The device is easily installed by providing a conical depression around the plant and connecting the segments of the lawn disk together to surround the plant. The triangular construction of the walls permits the upper surface of the disk to be flat while allowing the bottom surface to slant inwardly toward the plant. This conical bottom portion directs water inwardly to the roots of the plant. The chambers or reservoirs provide a substantial capacity for retaining water and causing it to seep slowly into the ground surrounding the plant. This is quite advantageous since the water would otherwise be lost through run-off.

Variations of the invention within the scope of the appended claims will be apparent to those of ordinary skill in the art.

What is claimed is:

1. Apparatus for surrounding the base of a vertical plant object for protecting the object, preventing the growth of grass and weeds adjacent said object and presenting a flat surface for supporting the wheels of a mowing vehicle, yet assure water and air exposure to the soil surface surrounding the object comprising:

a plurality of interconnecting segments radiating from an arcuate band to define a centrally located aperture for surrounding said object when interconnected, each of said segments comprising a plurality of closely-spaced, radially extending walls of a predetermined thickness, each of said walls having a substantially flat top surface which is coplanar with the top surfaces of the other said walls, and a bottom surface angularly oriented with respect to said top surface, whereby when said segment is adjacent said object said top surfaces will be substantially level to form a discontinuous but generally planar surface for supporting a mowing vehicle and said bottom surfaces sloping downwardly toward said object, and wherein said walls are spaced circumferentially from each other to provide a plurality of cavities, each of said cavities, radiating outwardly of said centrally located aperture, and bottom means extending between respective adjacent bottom surfaces of said walls, said bottom means being perforated to allow water to drain out and to allow air to ventilate through said bottom surface, whereby said cavities are completely open at their upper portions and partially closed at their lower portions by said bottom means so as to substantially prevent the germination and growth of grass and weeds in the area covered by said bottom surface.

2. The apparatus of claim 1, wherein said walls are triangular in a radial plane perpendicular to said top surface and trapezoidal in a plane containing said top surface, and said top.

3. The appartus of claim 1 wherein each of said segments is semi-circular and has an exposed diametrical edge, the diametrical edges of each segment having means for securing the two diametrical edges together.

4. The apparatus of claim 3 further comprising sealing means extending from the bottom of one segment and adapted to engage the bottom of the other segment when the segments are interconnected.

* * * * *